United States Patent Office 2,840,504
Patented June 24, 1958

2,840,504

PHENOTHIAZINE COMPOSITIONS

Donald E. Vierling, Pittsburgh, Pa.

No Drawing. Application September 28, 1955
Serial No. 537,285

8 Claims. (Cl. 167—53)

This invention relates to an anthelmintic composition and a method of administering the same to animals, more particularly to an anthelmintic composition containing phenothiazine and a method of administering the same to domestic animals, such as beef cattle.

Phenothiazine has been employed for many years as an anthelmintic for the removal of internal parasites from farm animals. In order for phenothiazine to be effective as an anthelmintic, however, it is necessary that it be administered to the host animal in relatively large doses. For example, in the case of livestock, such as mature beef cattle, a full therapeutic treatment of phenothiazine, which usually amounts to about 60 grams, must be administered to the animal over a period of not more than about three or four days, and preferably within a relatively short period of time, as for example twenty-four hours. This treatment, in order to be effective, must be conducted periodically at spaced intervals of about four times a year. In addition to administering a full therapeutic dose of phenothiazine to such animals as stated above, the treatment is usually supplemented by giving the animal a low-level dose of phenothiazine amounting to about two (2) grams per animal per day.

Unfortunately, phenothiazine is not palatable to farm animals and cannot be fed easily by the free choice administration thereof. Many methods of administering phenothiazine have been employed and numberless suggestions have been made therefor; but none of these has been satisfactory. Thus, in the case of beef cattle, the full therapeutic dose of phenothiazine is generally administered manually, often in the form of a drench suspension or bolus. Such manual administration involves rounding up the cattle and dosing them individually with the resultant wear and tear on both man and beast. Even the free choice administration of phenothiazine to cattle on the low-level basis of but two grams a day has proved difficult. One such method employed in administering low-level doses of phenothiazine involves incorporating the same in salt or mineral mixes of various formulations generally given to cattle. In such cases, however, the undesirable taste and odor of phenothiazine is readily apparent to the cattle; and they are reluctant in the consumption of the same. When this happens, they fail to receive not only the phenothiazine needed, but also the essential salt or mineral mixes incorporated therewith.

It is among the objects of the present invention to provide an improved anthelmintic composition containing phenothiazine, together with an improved method of administering the same to domestic animals, such as cattle, sheep, etc., in any desired amount, from the full therapeutic dose of phenothiazine of about 60 grams to the low-level dose of about two grams.

The improved composition of the present invention comprises phenothiazine, an inert, non-toxic, palatable stable agent having excellent adhering and masking characteristics, a stabilizing agent, and preferably a dispersing agent. The improved method of the present invention includes feeding animals forage and/or legumes, such as hay, clover, alfalfa, straw, and the like, which has been coated or impregnated with the improved composition.

The inert, non-toxic, palatable stable agent referred to hereinabove as employed in combination with the phenothiazine must, of course, be carefully chosen. In addition to the aforementioned qualities, it should preferably have a nutrient value; and possess excellent adhesive properties so that it readily adheres or clings to the forage and/or legumes.

Some adhering agents which are otherwise suitable for use with the anthelmintic composition of my invention have a tendency to become unstable and decompose upon standing; and I have discovered that such decomposition may be prevented or inhibited up to about one-half percent by weight of the final composition (and preferably about one-eighth to about one-fourth percent by weight) by incorporation of such a stabilizing agent as sulfur dioxide, sodium propionate, or sodium benzoate.

Since phenothiazine is not palatable to animals because of its highly objectionable odor and taste, the agent employed therewith must be palatable to the animal and, in addition, must mask the odor and taste thereof so that the animal is unaware of its intake. In order to improve palatability, sugar and other sweetening media may be added if desired. Flavoring media, such as anise, fenugreek, licorice, etc., may be also added to improve taste and odor.

By far the most important property required of the agent to be admixed with the phenothiazine is that it possess excellent coating and enveloping (and preferably impregnating) characteristics. If the phenothiazine, which is generally in the form of a fine powder, were added to the forage and/or legumes alone, not only would its undesirable odor and taste drive animals away from the feed in the vicinity thereof, but it would have a tendency to sift down through the forage and/or legumes and not be consumed by the animal.

According to the teachings of the present invention, the agent admixed with the phenothiazine possesses excellent adhering characteristics, so that, upon its contact with the forage and/or legumes, it sticks thereto and is taken internally into the body of the animal when it consumes the forage and/or legumes.

When animals are treated with the improved anthelmintic composition in accordance with the method of the present invention, I have found that there is absolutely no reluctance on the part of the animals to consume the relatively large amount of phenothiazine required for a full therapeutic dose. For example, using the composition and process described hereinbefore, I have had no difficulty whatever in administering to adult cattle quantities as high as about 180 grams of phenothiazine over a twenty-four hour period.

The quantity of adhering agent to be employed in combination with phenothiazine is exceedingly important, and must be sufficient to permit the composition to substantially envelop and readily adhere to the forage and/or legumes. In addition, the adhering agent must be used in such amount that it will dissolve in the stomach juices, releasing the phenothiazine particles so that they can perform their anthelmintic functions. The viscosity of the composition should be such that it can be sprayed or poured on the forage and/or legumes with little or no difficulty, although the viscosity should not be so low that the composition will flow off the forage and/or legumes. In general, these considerations are met by employing about one to about five parts by weight of adhering agent per part of phenothiazine; and preferably about two parts by weight of adhering agent per part of phenothiazine. If desired, a small amount of a thinning agent, such as water, can be added to the phenothiazine composition. In such case, the amount of thinner added to the composition may be up to about 50% by weight of the final composition, and preferably about 10 to about 20 percent by weight.

An excellent agent meeting all of the above requirements which may be used in the desired composition in combination with the phenothiazine is lecithin, such as hydroxylated lecithin or crude soya lecithin. Other suitable agents include olive oil, corn syrup, mineral oil, cod liver oil, etc.

The amount of phenothiazine composition disclosed herein which must be added to the forage and/or legumes in order to administer the desired amount of phenothiazine to the host animal is extremely important, although, of course, it will vary with such factors as the dosage desired and the type and age of the animal sought to be treated. Thus, in the case of adult beef cattle, I have found that about 160 to about 600 grams of the composition comprising phenothiazine and the desired agent must be added to the forage and/or legumes, such as hay, in order to administer a full therapeutic dose of approximately 60 grams of phenothiazine.

Any suitable method may be employed in the preparation of my composition. One such method comprises slowly stirring the inert, non-toxic, palatable agent at about 100° F. and atmospheric pressure, and thereafter adding phenothiazine and stabilizing agent slowly to the adhering agent during the stirring operation. If any additional ingredients are incorporated in the composition, they may be added at this point, the mixture being stirred continuously. Another suitable method of manufacture comprises placing the inert, non-toxic, palatable agent at about 100° F. and atmospheric pressure on compounding rolls. The rolls are rotated and the powdered phenothiazine and stabilizing agent slowly added. If any additional ingredients are to be incorporated in the composition, they may be added at this point while the rolls continue their compounding operation. In order to aid the dispersion of phenothiazine in the adhering agent, a dispersing agent, such as sodium alginate, may be used. The dispersing agent may be used in quantities of up to about two percent, preferably about one-eighth to about one-fourth percent, by weight of the total composition.

Following are examples of my improved composition and its method of administration:

*Example I*

About 180 grams of a composition comprising 60 grams of phenothiazine, 119½ grams of lecithin and about one-half gram of sodium propionate was prepared and poured over ten pounds of hay.

*Example II*

A composition comprising 180 grams and having 60 grams of phenothiazine, 119½ grams of corn syrup and about one-half gram of sodium propionate was prepared and poured over ten pounds of hay.

*Example III*

A composition comprising 242.1 grams and having 60 grams of phenothiazine, 120 grams of corn syrup, 60 grams of water, two grams of sodium alginate and 0.1 gram of sodium benzoate was prepared and poured over ten pounds of hay.

In each of the three aforementioned examples, the treated hay was fed to an adult beef cattle which willingly consumed same over a 24-hour period; and, in each instance, the amount of phenothiazine consumed was approximately 60 grams. In each instance, the cattle was observed over a period of approximately one week; and no adverse effects whatever were noted.

I have also found that many other essential chemicals, such as trace elements, antibiotics, growth stimulating hormones, ruminant bacteria, etc., may be added to the mixture for ease of administration thereof. These essential chemicals may be added to the adhering or carrying agent with or without phenothiazine.

While I have shown and described certain specific embodiments of the present invention, it will be readily understood that I do not wish to be limited exactly thereto, since various modifications may be made without departing from the scope of the invention as defined in the appended claims.

I claim:

1. An anthelmintic composition comprising a liquid suspension of about one part by weight of phenothiazine and at least about one part by weight of an inert, non-toxic, palatable, liquid, viscous stable agent having adhering characteristics and substantially enveloping said phenothiazine, said stable agent being selected from the group of animal-edible syrups and oils consisting of lecithin, olive oil, corn syrup, mineral oil and cod liver oil, said composition possessing sufficient consistency to preclude its flowing freely through legumes and the like.

2. An anthelmintic composition comprising a liquid suspension of about one part by weight of phenothiazine and about one to about five parts by weight of an inert, non toxic, palatable, liquid, viscous stable agent having adhering characteristics and substantially enveloping said phenothiazine, said stable agent being selected from the group of animal-edible syrups and oils consisting of lecithin, olive oil, corn syrup, mineral oil and cod liver oil, said composition possessing sufficient consistency to preclude its flowing freely through legumes and the like.

3. An anthelmintic composition comprising a liquid suspension of about one part by weight of phenothiazine and about two parts by weight of an inert, non-toxic, palatable, liquid, viscous stable agent having adhering characteristics and substantially enveloping said phenothiazine, said stable agent being selected from the group of animal-edible syrups and oils consisting of lecithin, olive oil, corn syrup, mineral oil and cod liver oil, said composition possessing sufficient consistency to preclude its flowing freely through legumes and the like.

4. An anthelmintic composition comprising a liquid suspension of about one part by weight of phenothiazine and at least about one part by weight of an inert, non-toxic, palatable, liquid, viscous stable agent having adhering characteristics and substantially enveloping said phenothiazine, said stable agent being selected from the group of animal-edible syrups and oils consisting of lecithin, olive oil, corn syrup, mineral oil and cod liver oil, and a palatable dispersing agent, said anthelmintic composition possessing sufficient consistency to preclude its flowing freely through legumes and the like.

5. An athelmintic composition comprising about one part by weight of phenothiazine and at least about one part by weight of lecithin substantially enveloping said phenothiazine, said composition possessing sufficient consistency to preclude its flowing freely through legumes and the like.

6. An anthelmintic composition comprising about one part by weight of phenothiazine, at least about one part by weight of lecithin substantially enveloping said phenothiazine, and sodium propionate, said composition possessing sufficient consistency to preclude its flowing freely through legumes and the like.

7. An anthelmintic composition comprising about one part by weight of phenothiazine and about one to about five parts by weight of corn syrup, said composition possessing sufficient consistency to preclude its flowing freely through legumes and the like.

8. An anthelmintic composition comprising about one part by weight of phenothiazine and about two parts by weight of corn syrup, said composition possessing sufficient consistency to preclude its flowing freely through legumes and the like.

(References on following page)

References Cited in the file of this patent

UNITED STATES PATENTS

| | | |
|---|---|---|
| 2,407,486 | Flenner | Sept. 10, 1946 |
| 2,439,532 | Whiting | Apr. 13, 1948 |
| 2,664,380 | Vierling | Dec. 29, 1953 |

OTHER REFERENCES

Merck Index: 6th ed., Merck and Co., Rahway, N. J., 1952, p. 887.

McCulloch: J. Am. Vet. Med. Assn., vol. 101, No. 785, pp. 114, 117, 118 and 119.